Dec. 14, 1954     H. ARROYO L.     2,697,003
SAFETY DEVICE TO FACILITATE QUICK
EXIT OF OCCUPANTS FROM VEHICLES
Filed Aug. 25, 1953     2 Sheets-Sheet 1
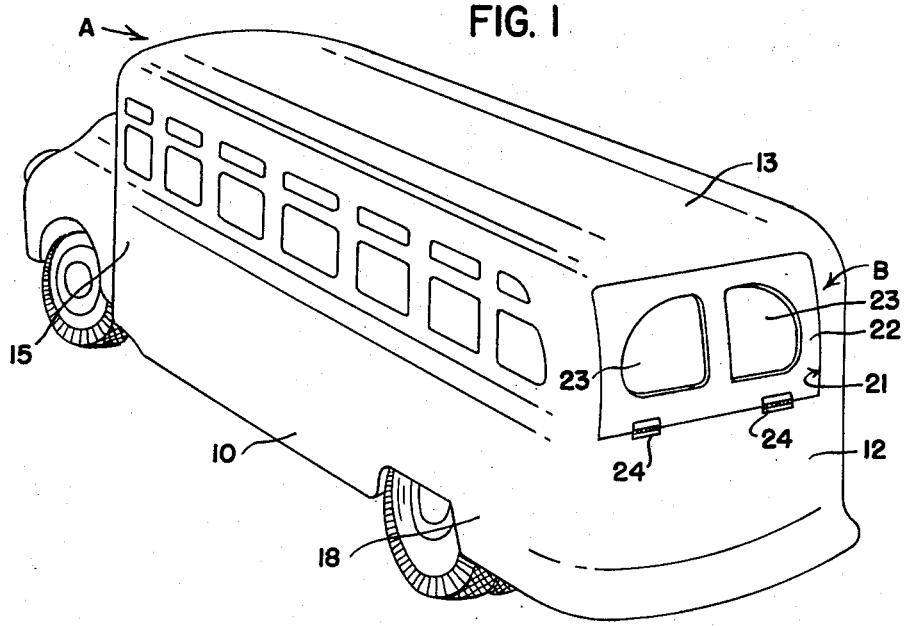
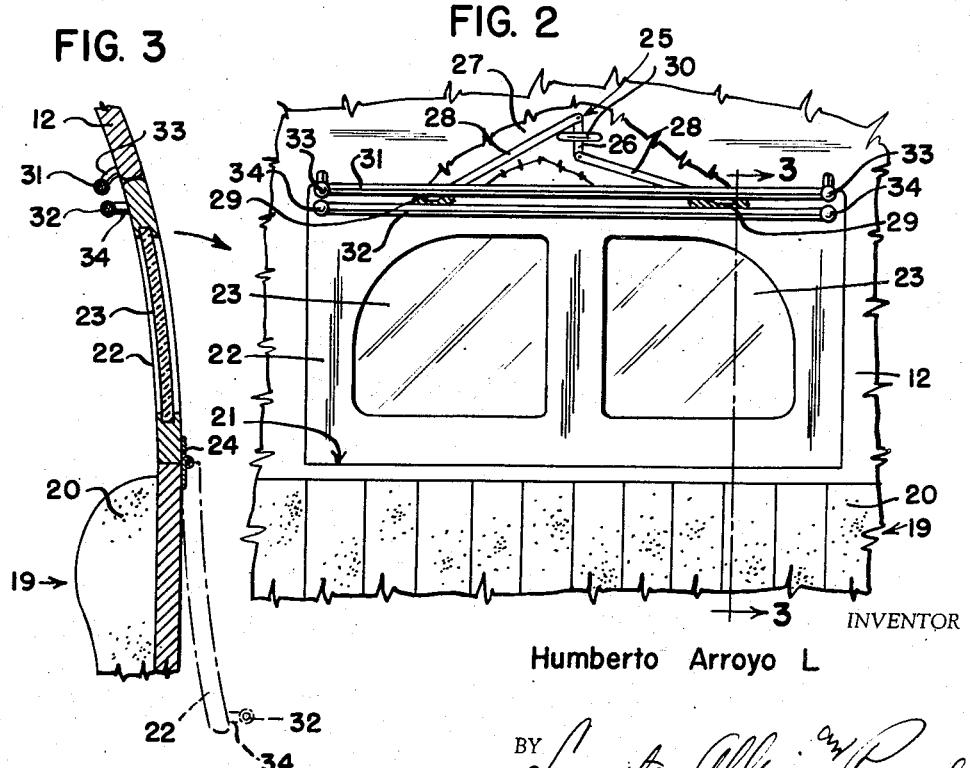
INVENTOR
Humberto Arroyo L
BY *Lancaster, Allwine Rommel*
ATTORNEYS Dec. 14, 1954  H. ARROYO L.  2,697,003
SAFETY DEVICE TO FACILITATE QUICK
EXIT OF OCCUPANTS FROM VEHICLES
Filed Aug. 25, 1953  2 Sheets-Sheet 2
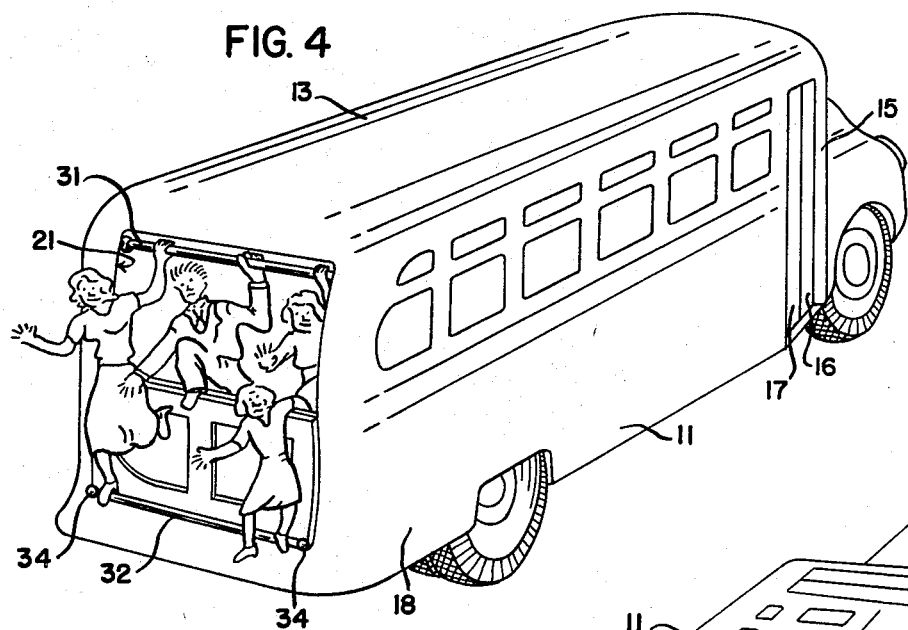
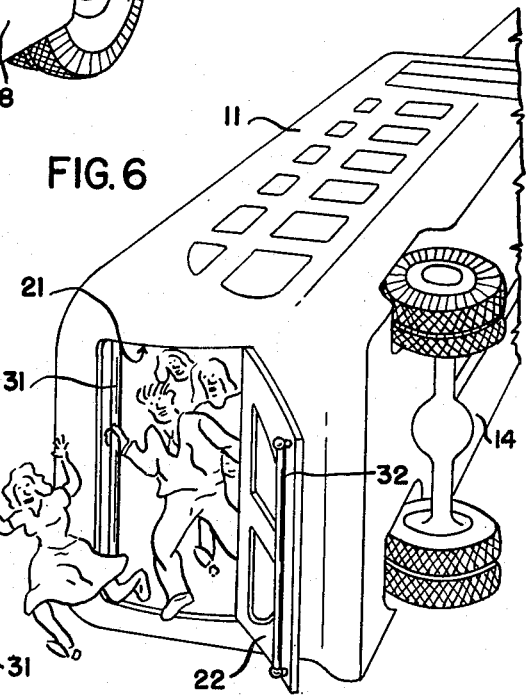
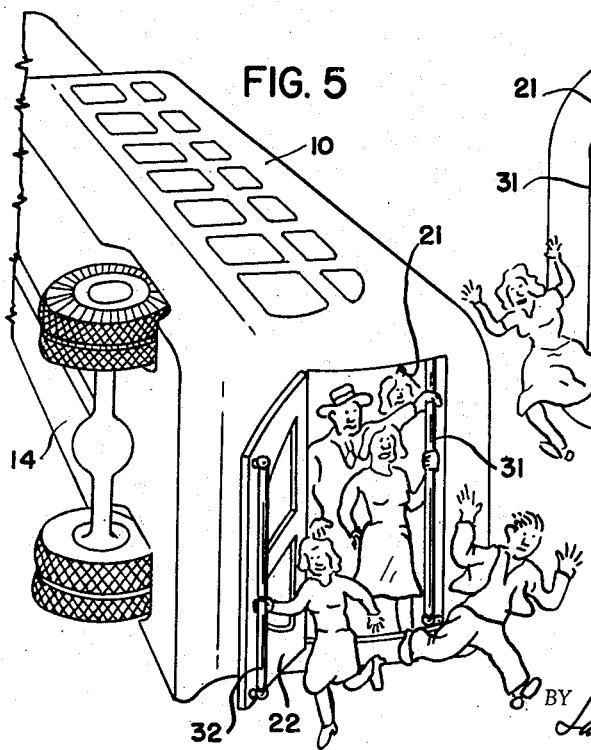
INVENTOR
Humberto Arroyo L
ATTORNEYS

United States Patent Office 2,697,003
Patented Dec. 14, 1954

2,697,003

SAFETY DEVICE TO FACILITATE QUICK EXIT OF OCCUPANTS FROM VEHICLES

Humberto Arroyo L., Mexico City, Mexico

Application August 25, 1953, Serial No. 376,461

1 Claim. (Cl. 296—44)

This invention relates to vehicles, such as passenger buses, and more particularly to safety devices built into vehicles for the benefit of the occupants thereof to facilitate their quick exit from the vehicles.

Among the hazards of highway traffic are those in which an accident requires quick exodus of the occupants of a vehicle, such as a passenger bus. Emergency exits are sometimes provided in the side or sides of the vehicle, separate from the conventional entry and/or exit openings but such emergency exits may be rendered useless as, for example, when a vehicle rolls over on its side containing an emergency exit. If this is the only emergency exit the occupants are trapped other than being able to leave through the relatively small conventional entry and/or exit openings. If the other side wall contains an emergency exit, it is generally inaccessible since it is now in the highest part of the vehicle and difficult to reach.

An important object of this invention is to provide a single emergency exit for a vehicle which is not rendered useless nor difficult to reach, no matter on which of its sides the vehicle may land.

In case of fire, which frequently starts in a vehicle under the hood or in the forward portion of the vehicle near the motor, the side wall emergency exits may be rendered useless because they are too far forward or are sheeted in flames driven rearwardly by a moving vehicle out of control.

A further important object of the invention is to provide an emergency exit positioned at the extreme rearward portion of the vehicle and opening to the rear of the same.

Another important object is to provide a safety device for a vehicle, embodying an emergency exit, in which device a portion thereof has dual functions.

Since the closure of the emergency exit of this disclosure does not swing nor slide as would an ordinary exit closure and is positioned nearer the roof rather than extending upwardly from or adjacent the floor of the vehicle, it may be opened to provide for auxiliary ventilation of the interior of the vehicle without danger of the occupants accidently stepping from or falling through the exit.

Other objects and advantages of the invention will be apparent during the course of the following detailed description thereof, taken in connection with the accompanying drawings, forming a portion of this disclosure and in which drawings:

Fig. 1 is a perspective view of a vehicle equipped with the safety device of this disclosure.

Fig. 2 is a fragmentary interior rear-end view of the vehicle of Fig. 1, with parts broken away to illustrate portions of the structure otherwise out of sight.

Fig. 3 is a vertical section, substantially on the line 3—3 of Fig. 2.

Fig. 4 is a perspective view of a vehicle, equipped with the safety device showing means for emergency exit when the vehicle is rightened.

Fig. 5 is a fragmentary perspective view of the vehicle turned over on one side and illustrating the safety device in use.

Fig. 6 is a fragmentary perspective view of the vehicle of Fig. 5 turned over on its other side and picturing the safety device in use.

In the drawings, wherein for the purpose of illustration is shown a preferred embodiment of the invention and wherein similar reference characters designate corresponding parts throughout the several views, the letter A designates a vehicle and B the safety device.

The vehicle A is illustrated as a passenger bus having side walls 10 and 11, a rear wall 12, a roof 13, a floor 14, a front portion 15 having, by way of illustration only, a combined entrance and exit 16, provided with a closure 17, and a rear portion 18. Referring to Fig. 2, there is a rear, laterally-extending seat 19 in the rear portion 18 with its back 20 against the inner face of the rear wall 12, which wall, above the back 20, is provided with a part of the safety device B, being an opening or emergency exit 21 from the interior of the vehicle to the exterior thereof. This opening 21 extends, from very slightly above the upper end of the back 20, upwardly to beneath the horizontal plane of the roof 13 and the sides of the opening are preferably very near the horizontal planes of the side walls 10 and 11 respectively. Preferably the opening 21 defines an oblong. The opening is provided with a rigid closure 22 which may have windows 23 and is hingedly connected to the rear wall 12 as by leaf hinge means 24, secured to the lower portion of the closure 22 and rear wall 12 below the opening 21, and positioned so that the closure will swing downwardly and outwardly, and, when swung to its extreme lower position, will come to rest against, for example, the outer face of the rear wall 12 and with its lowest edge near the bottom of that wall, as is clear in Fig. 4.

Any suitable closure fastener means may be provided for the closure 22. For example, I may provide a toggle means 25, shown in Fig. 2, comprising a short bar 26 pivotally connected, at its center, to the wall of a recess 27 in the upper portion of the rear wall 12 above the opening 21 on the latter's vertical medial axis, to the end portions of which bar 26 are pivoted the upper end portions of two downwardly and outwardly projecting arms 28, the lower end portions of which are adapted to slide into and out of keeper slots 29, opening to the upper edge of the closure 22, upon partial rotation of a handle 30 rigidly secured to the center of the bar 26 and which causes partial rotation of the latter. Clockwise rotation of the handle 30 of Fig. 2 will cause the lower end portions of the arms 25 to slide from the slots 29 and release the closure 22 to swing, on its hinge means, outwardly and downwardly.

Referring to Fig. 2, it will be seen that there is provided two important portions of the safety device B. These comprise the rods or bars 31 and 32. Both are elongated, rigid, circular in transverse section, and may be smooth surfaced. They may be of wood, metal, hardened plastic or combinations thereof and of a strength to support the combined weight of three or four persons of average weight. The first rod 31 is fixedly secured, as by suitable brackets 33, to project from the inner face of the rear wall 12 slightly above the upper edge of the opening 21 and substantially parallels that edge. Preferably, the shortest distance of the rod 31 from the inner face of the wall 12 should be around 2½ inches although the distance may be somewhat greater, if desired. The rod 31 functions as a handrail.

The second rod 32 is rigidly carried by the closure 22 by suitable brackets 34 extending from the inner face of the closure and it substantially parallels the normally upper edge of the closure, and is preferably close to that edge. It is distanced from the closure substantially as is the rod 31 from the rear wall 12. The reason for these spacings is so that an occupant of the vehicle may readily cup his hand about the rod 31 or 32 and so that, in addition, the rod 32 may provide a step for the foot of the occupant under certain conditions, whereby the rod 32 provides, in one case, a handrail, and in another case, a footrail.

In use, should an emergency occur, such as fire in the front portion 15 of the vehicle A, positioned as in Fig. 4, the closure fastening means 25 being operated to rotate the handle 30 clockwise, the closure 22 will swing, by gravity, to the position shown in Fig. 4. The occupants, climbing upon the seat 19 use the upper edge of the back 20 as an initial step, and grasping the rod 31, swing themselves outwardly and downwardly until their feet or a foot comes to rest upon the rod 32, which is now near the ground, and step off to safety, the lower edge of the opening providing an auxiliary hold if needed. In the event of an accident which overturns the vehicle on its side 11, as in Fig. 5 or on its side 10, as in Fig. 6, the rods 31 and 32 become upwardly-extending handrails or hand holds, for the occupants exiting from the vehicle A; as is clear in Figs. 5 and 6. Since the sides of the opening 21 are close to the plane of the side walls 10 or 11, the step down is short and easy.

While the invention is primarily to embody a safety device, it is now clear that the closure 22, when swung downwardly, provides for auxiliary ventilation and is high enough so there is no danger of occupants of the vehicle falling out.

Various changes may be made to the form of the invention herein shown and described, without departing from the spirit of the invention or scope of the claim.

What is claimed is:

A safety device to facilitate the quick exit of occupants from a vehicle having a rear wall, said device including portions of said wall defining an emergency exit having an upper edge, a closure for the exit having a first edge portion lowermost when said closure is in a closed position, and a second edge portion uppermost when said closure is in a closed position, means hinging said closure to said wall at said first edge portion to swing outwardly, a rod secured to said wall and extending substantially horizontally therealong and close to said upper edge, a combined handrail and footrail carried by said closure at said second edge portion and extending longitudinally of said closure along the inner face thereof and spaced therefrom, whereby when said closure is swung outwardly and the longitudinal axis of said closure is substantially horizontal, said combined handrail and footrail provides a footrail and when the longitudinal axis of said closure is upwardly extending said combined handrail and footrail provides a handrail, and means to releasably secure said closure in a closed position.

References Cited in the file of this patent

UNITED STATES PATENTS

| Number | Name | Date |
| --- | --- | --- |
| 2,303,670 | Turner | Dec. 1, 1942 |
| 2,469,159 | Dombrowiak | May 3, 1949 |
| 2,509,362 | Miller | May 30, 1950 |

FOREIGN PATENTS

| Number | Country | Date |
| --- | --- | --- |
| 137,358 | Great Britain | Jan. 15, 1920 |
| 361,923 | Great Britain | Nov. 27, 1931 |
| 423,628 | Great Britain | Feb. 5, 1935 |